April 23, 1963   B. P. RAGSDALE   3,086,552
COUNTERBALANCE MECHANISM
Filed May 20, 1960   9 Sheets-Sheet 1
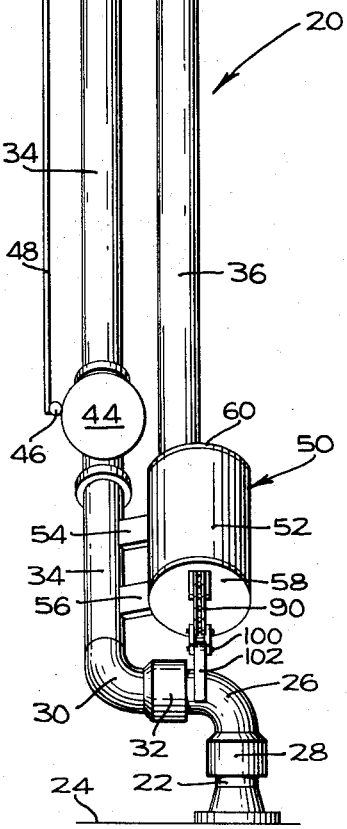
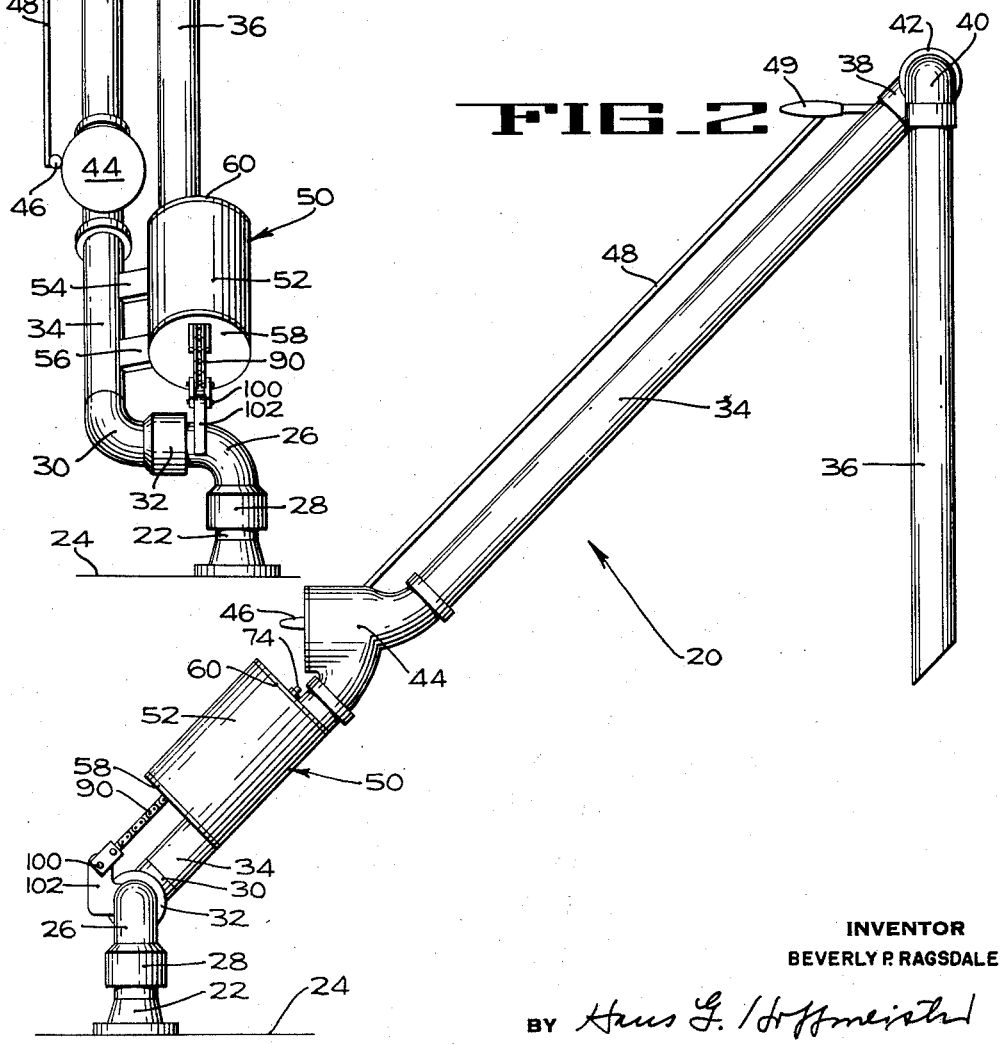
INVENTOR
BEVERLY P. RAGSDALE
BY *Hans G. Hoffmeister*
ATTORNEY April 23, 1963  B. P. RAGSDALE  3,086,552
COUNTERBALANCE MECHANISM
Filed May 20, 1960  9 Sheets-Sheet 2
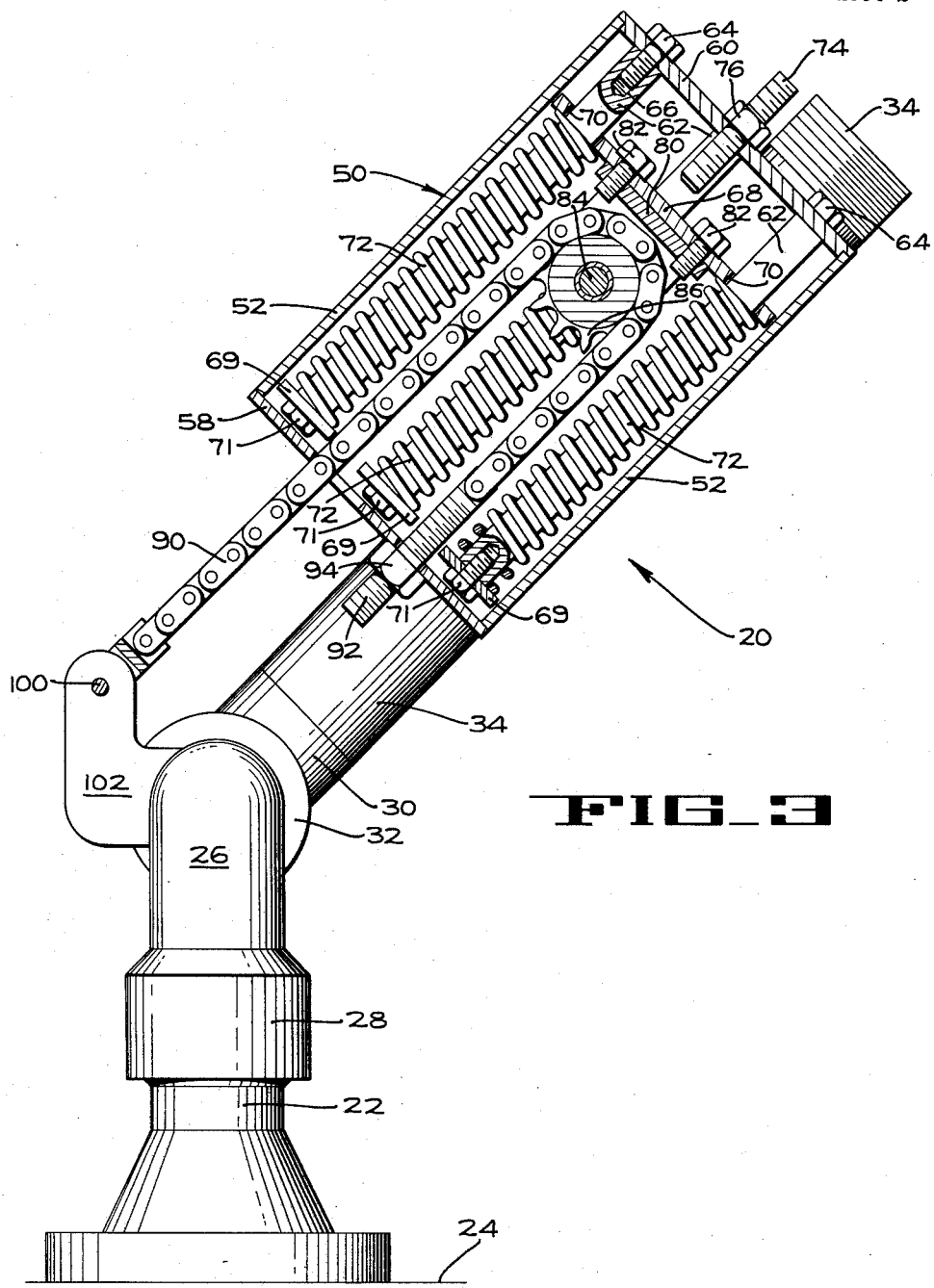
FIG_3
INVENTOR
BEVERLY P. RAGSDALE
BY *Hans G. Hoffmeister*
ATTORNEY April 23, 1963 B. P. RAGSDALE 3,086,552
COUNTERBALANCE MECHANISM
Filed May 20, 1960 9 Sheets-Sheet 3

INVENTOR
BEVERLY P. RAGSDALE
BY
ATTORNEY

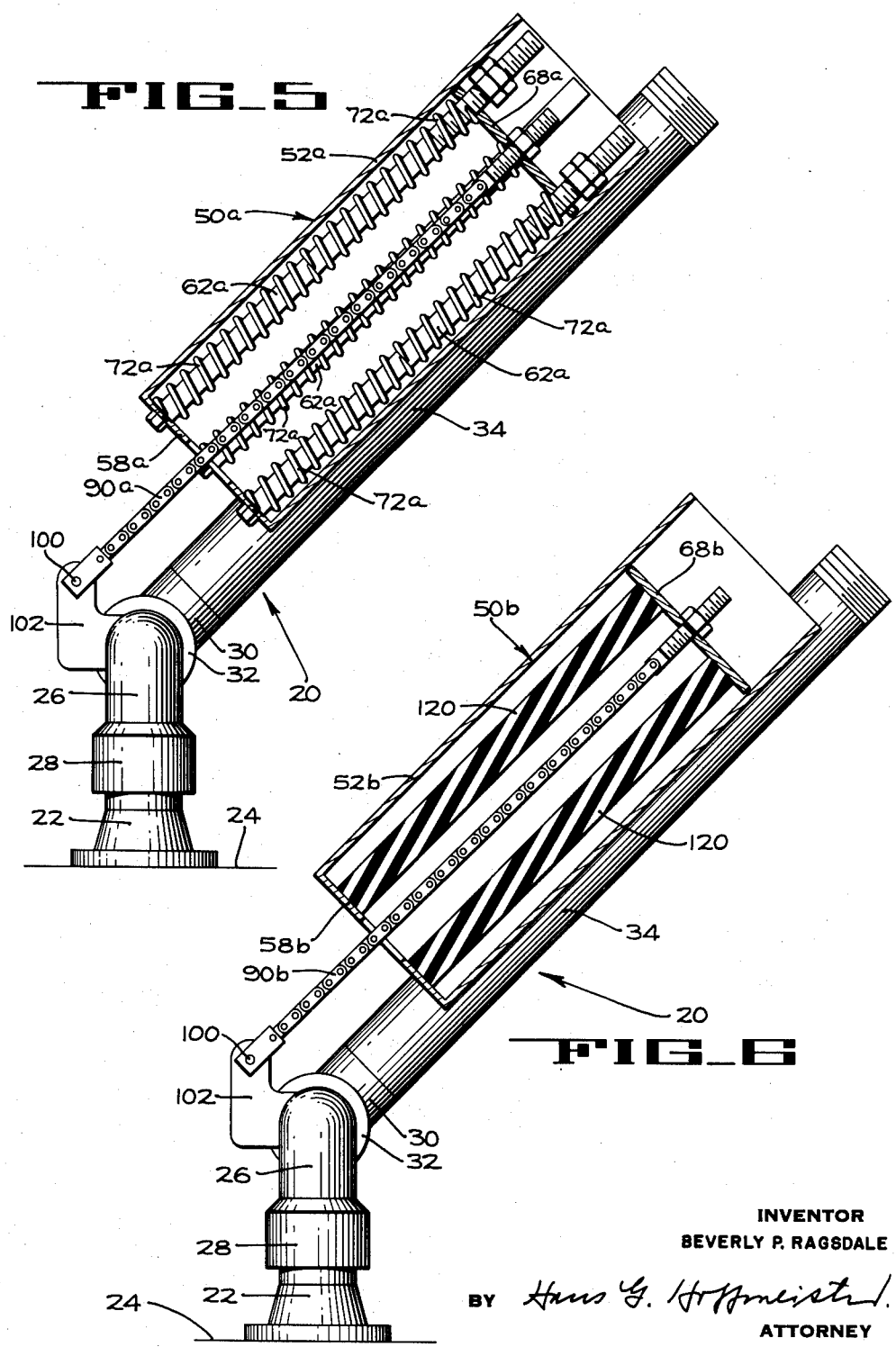

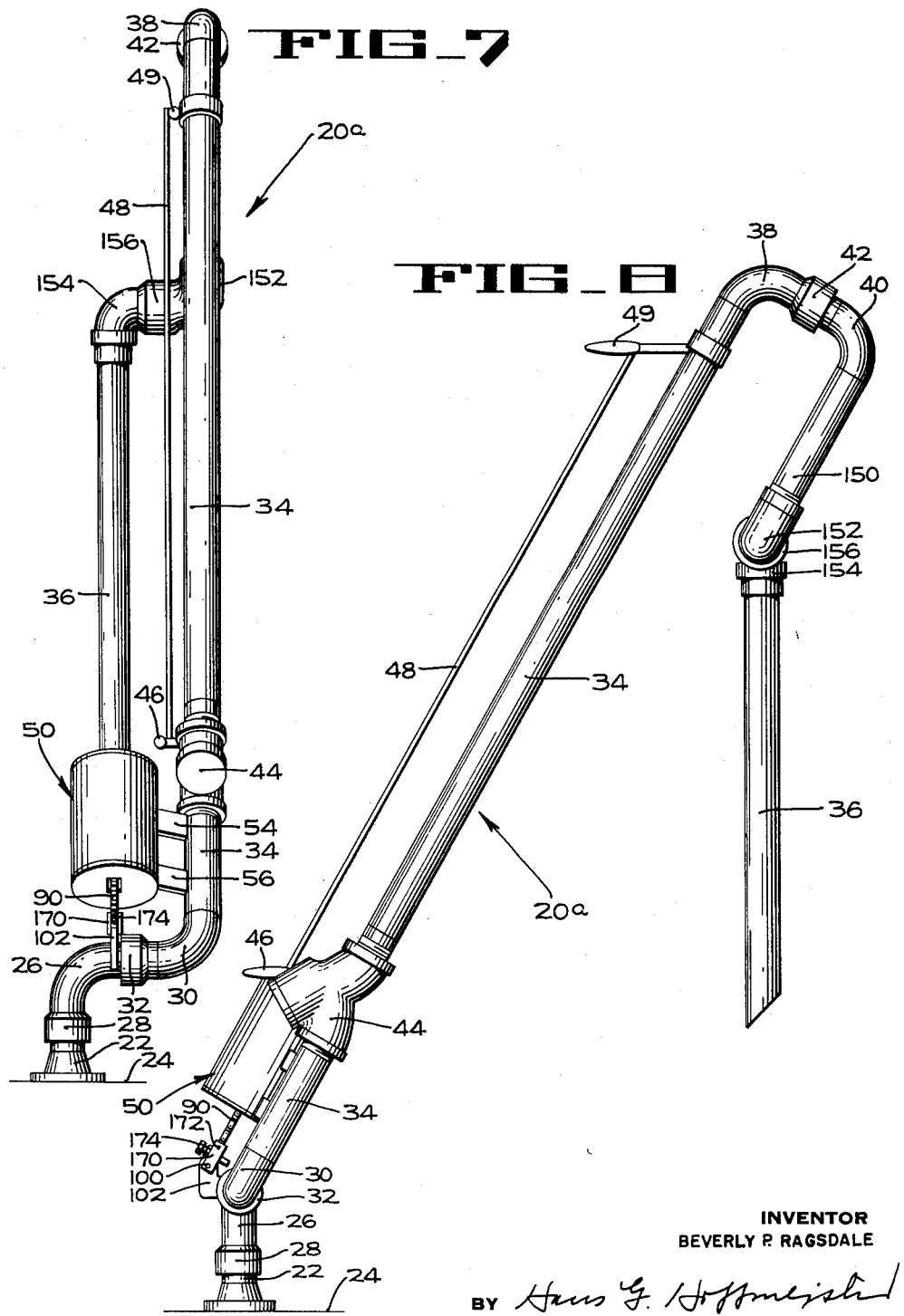

April 23, 1963     B. P. RAGSDALE     3,086,552
COUNTERBALANCE MECHANISM
Filed May 20, 1960     9 Sheets-Sheet 6
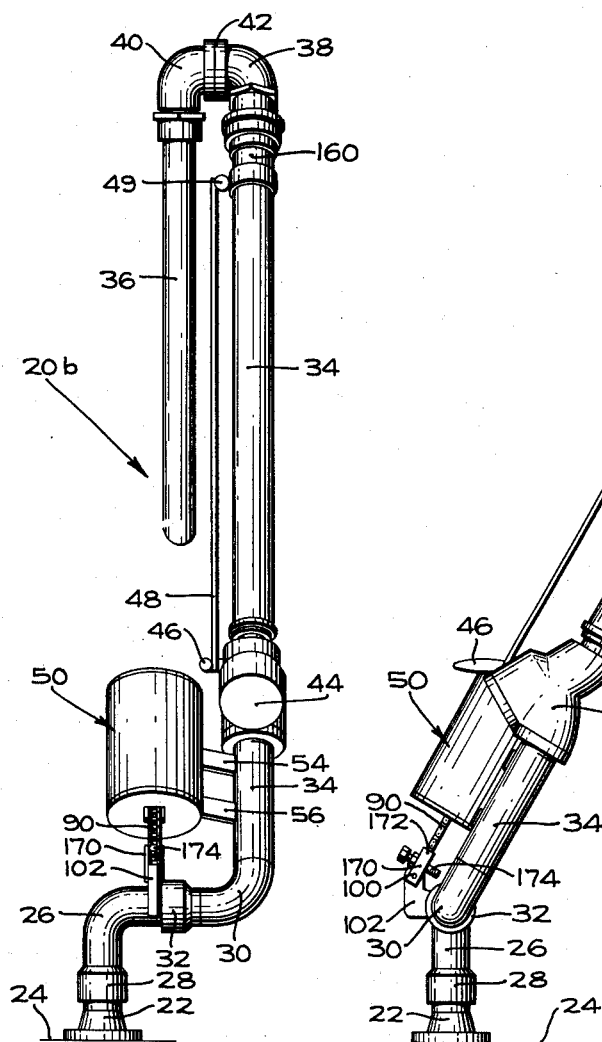
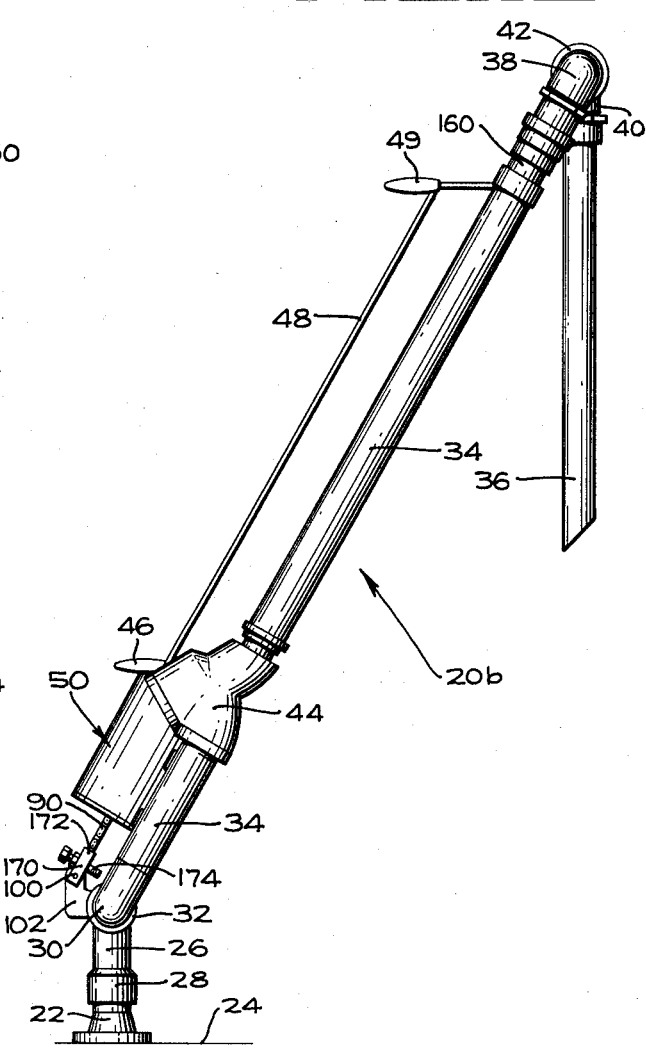
INVENTOR
BEVERLY P. RAGSDALE
BY *Hans G. Hoffmeister*
ATTORNEY April 23, 1963   B. P. RAGSDALE   3,086,552
COUNTERBALANCE MECHANISM
Filed May 20, 1960   9 Sheets-Sheet 7
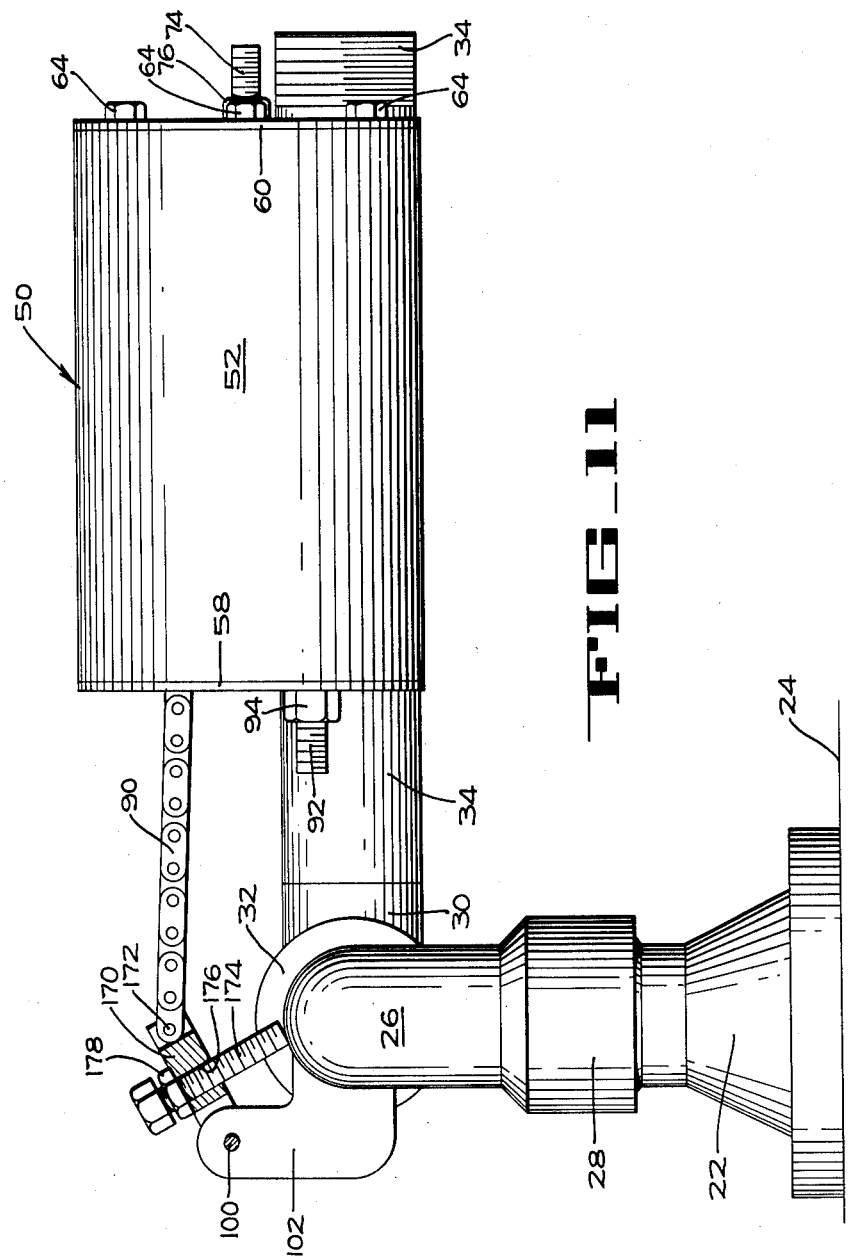
FIG_11
INVENTOR
BEVERLY P. RAGSDALE
BY *Hans F. Hofmeister*
ATTORNEY

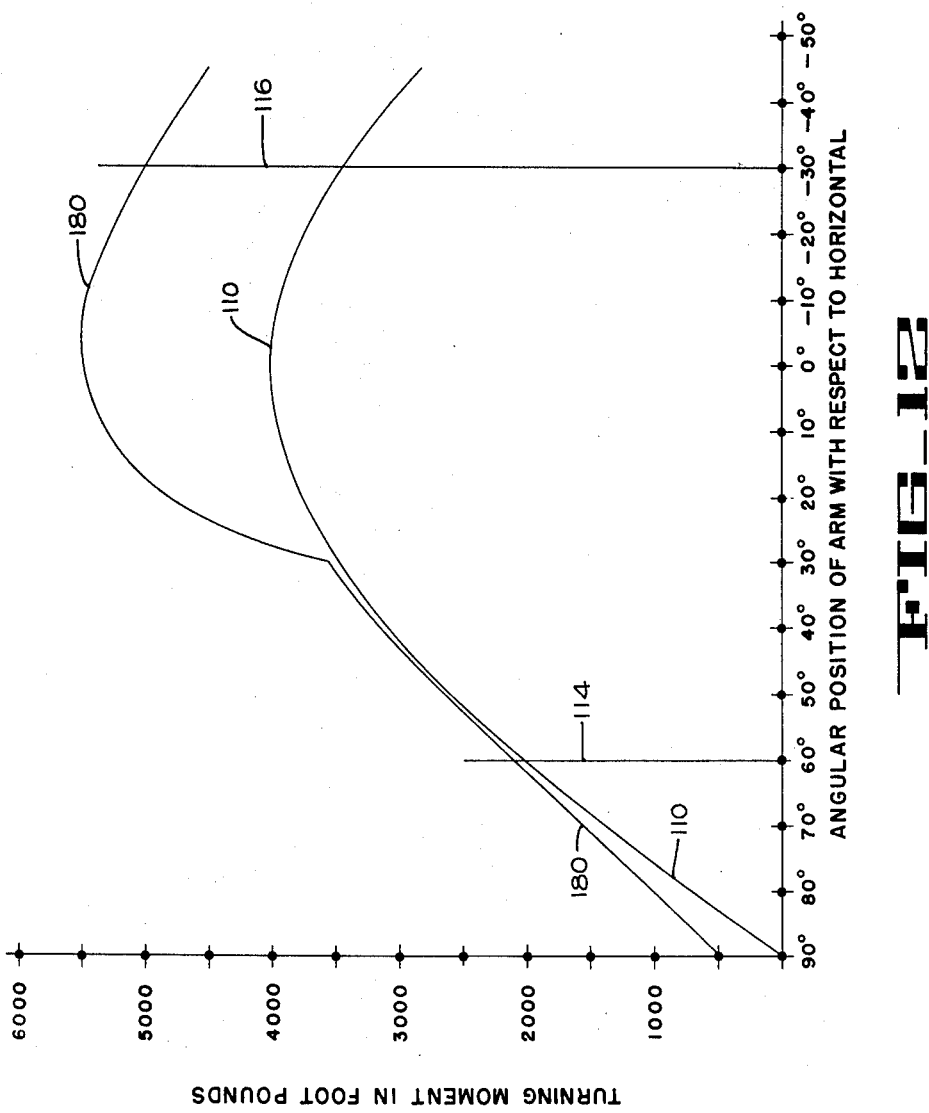

April 23, 1963     B. P. RAGSDALE     3,086,552
COUNTERBALANCE MECHANISM
Filed May 20, 1960     9 Sheets-Sheet 9
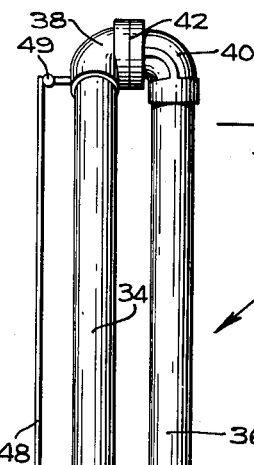
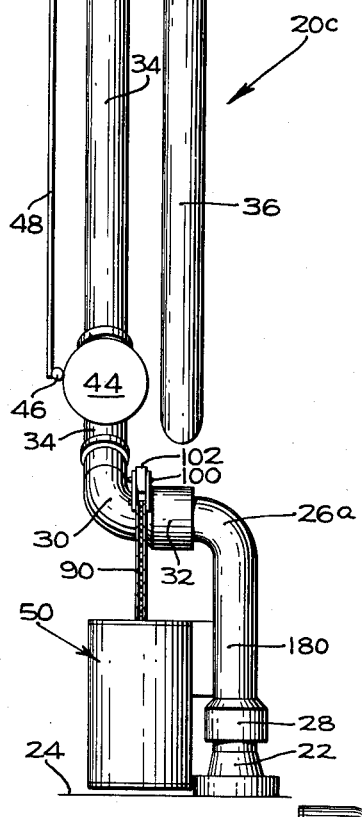
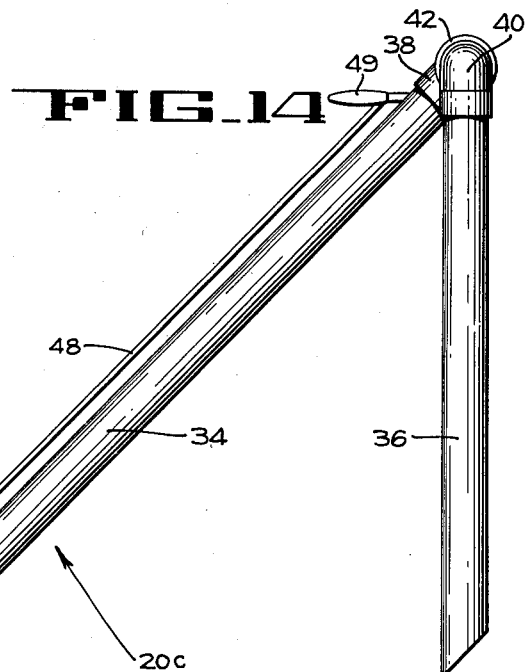
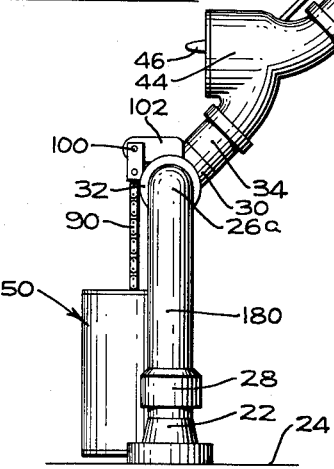
INVENTOR
BEVERLY P. RAGSDALE
BY *Hans G. Hoffmeister*
ATTORNEY

United States Patent Office 3,086,552
Patented Apr. 23, 1963

3,086,552
COUNTERBALANCE MECHANISM
Beverly P. Ragsdale, Whittier, Calif., assignor, by mesne assignments, to FMC Corporation, San Jose, Calif., a corporation of Delaware
Filed May 20, 1960, Ser. No. 30,624
6 Claims. (Cl. 137—615)

This invention pertains to a counterbalance assembly for fluid conveying apparatus.

In many industries, fluids must be loaded into tank cars, trucks or other vehicles. It is common practice to provide for this purpose a riser pipe connected to a supply line and having connected to its upper end a pipe which may be swung in a vertical plane to bring the distal end thereof into position to deliver fluid from the riser into the vehicle. Apparatus of this type is known in the trade as a "loading arm" and will be so identified herein.

An object of the present invention is to provide an improved counterbalance mechanism.

Another object of the invention is to provide a counterbalance mechanism that will maintain a loading arm in static balance throughout its range of operation.

Another object of the invention is to provide a counterbalance mechanism which is capable of easy adjustment.

Another object of the invention is to provide a counterbalance mechanism which is compact and located out of the way so as to avoid interference with storage, movement, or use of the apparatus counterbalanced thereby.

Another object of the invention is to provide a counterbalance mechanism which is simple to maintain, and which will not hinder the normal servicing and maintenance of the loading arm.

These and other objects and advantages of the present invention will become apparent from the following detailed description and drawings, wherein:

FIG. 1 is a rear elevation of a loading arm assembly employing the counterbalance mechanism of the present invention.

FIG. 2 is a side elevation of the loading arm assembly illustrated in FIG. 1.

FIG. 3 is a fragmentary side elevation similar to FIG. 2 but drawn to a larger scale, with the counterbalance mechanism shown in section.

FIG. 5 is a fragmentary side elevation similar to FIG. 3 and illustrates a modification of the spring arrangement for the counterbalance mechanism.

FIG. 6 is a fragmentary side elevation of another modification of the spring assembly.

FIGS. 7 and 8 are rear and side elevations, respectively, of a modified form of a loading arm incorporating the counterweight mechanism of the invention and having a fold-out section adjacent its terminal end to increase the reach thereof.

FIGS. 9 and 10 are rear and side elevations, respectively, of another modified form of loading arm which is telescopically extensible to increase its reach and which includes the counterweight mechanism of the invention.

FIG. 11 is a fragmentary side elevation showing the loading arm in its horizontal position and illustrating a modification of the counterbalance mechanism of FIGS. 1–4 which is particularly advantageous with the extensible loading arm assemblies illustrated in FIGS. 7–10.

FIG. 12 is a graph of the turning moments acting upon a loading arm of the type illustrated in FIGS. 7 and 8 or of the type illustrated in FIGS. 9 and 10 and employing the counterbalance mechnism illustrated in FIG. 11.

FIGS. 13 and 14 are rear and side elevations, respectivey, of another modification of the loading arm assembly, and illustrates an alternate mounting for the counterbalance mechanism of the present invention.

Figure 4:
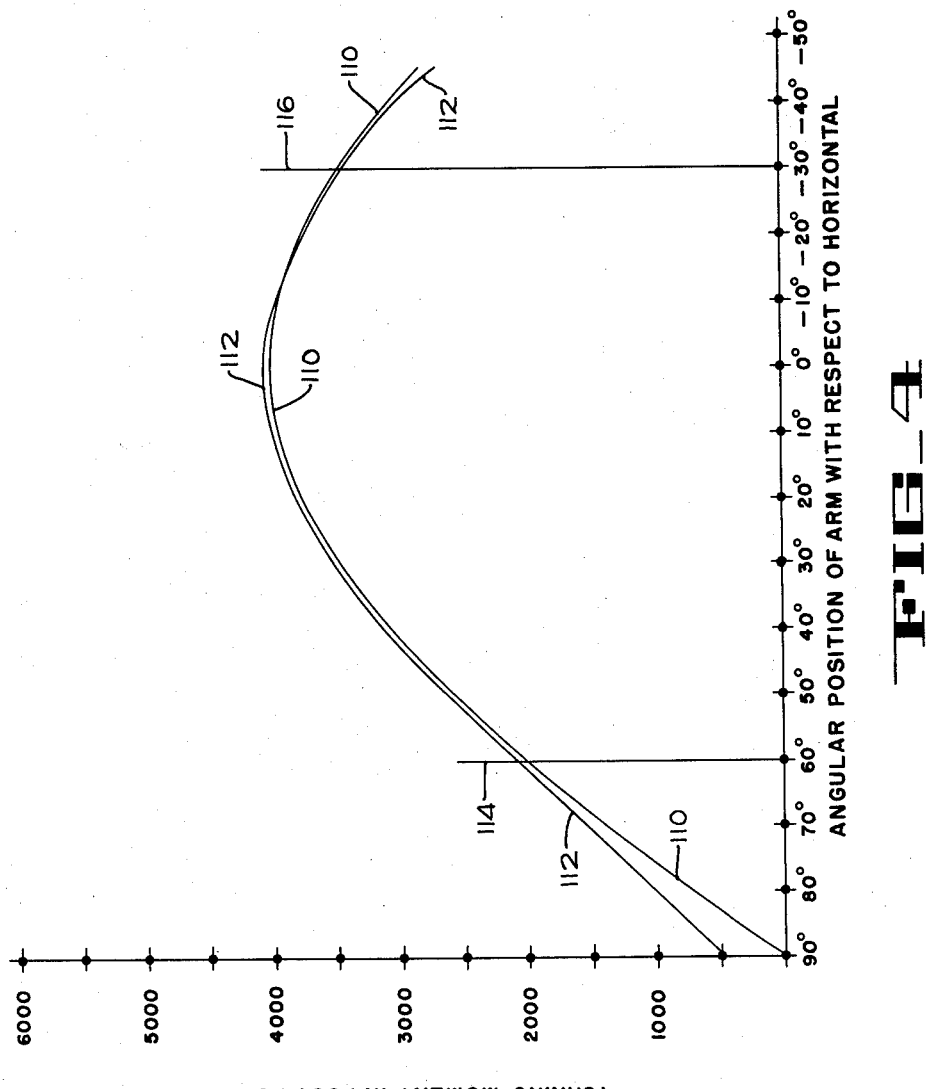
FIG. 4 is a graph of the opposed turning moments due, respectively, to gravity and to the counterbalance mechanism illusrated in FIG. 3, plotted against the positions of the loading arm with respect to the horizontal.

Referring now particularly to FIGS. 1–4 of the drawings, the loading arm or conduit assembly 20 comprises a vertical conduit section, or riser 22, mounted on a platform 24 and connected to a fixed pressurized fluid supply pipe line (not shown) in fluid conducting communication therewith. The platform 24 is usually mounted at a higher elevation than the roadway or other surface (not shown) supporting the vehicles (not shown) to be filled by means of the loading arm assembly 20.

A 90° elbow 26 is connected to the upper end of the riser pipe 22 by a swivel pipe joint 28 to permit rotation of the assembly about the vertical axis of the riser 22. A second 90° elbow 30 is connected to the first elbow 26 by a swivel pipe joint 32. A second conduit section 34 is connected to the elbow 30 and projects radially from the horizontal axis of the outlet end of the second swivel joint 32. Thus the two swivel joints 28 and 32 not only establish fluid conducting communication between the riser pipe 22 and the conduit 34, but they also mount the conduit section 34 for pivotal movement about mutually perpendicular axes. A terminal conduit section or spout 36 is connected to the distal end of the conduit section 34 by a pair of 90° elbows 38 and 40, respectively, which are interconnected by a swivel joint 42 so that the spout 36 is freely suspended therefrom.

A valve 44 is incorporated in the conduit section 34 for controlling flow therethrough and is actuated by a handle 46. A rod 48 connects the handle 46 with a remote control handle 49 pivotally mounted adjacent the distal end of the conduit section 34.

The counterbalance mechanism 50 of the present invention comprises a cylindrical housing 52 fixed to the conduit section 34 by a pair of mounting brackets 54 and 56 (FIG. 1) with its axis parallel to, and offset laterally from, the axis of the conduit section 34. An end plate 58 is fixed to the end of the cylindrical housing 52 which is closer to the pivot for the conduit section 34. A removable cover plate 60 is mounted on the opposite end of the cylindrical housing 52. A plurality of guide rods 62 are mounted within the housing 52 by cap screws 64 which project through suitable openings of the cover plate 60 and are screwed into suitably tapped bores 66 provided in the ends of guide rods 62.

A spring compressing plate 68 is mounted within the housing 52 and is provided with suitable openings 70 to accommodate the guide rods 62 so that the plate 68 can move axially of said rods. A compression spring 72 surrounds each of the guide rods 62 and is confined between the under surface of the compressor plate 68 and a spring retaining washer 69 fastened to the end of the associated guide rod 62 by a cap screw 71. An adjustable stop stud 74 is screwed through a suitably tapped opening centrally of the cover plate 60 to abut the compressor plate 68 and stop its outward movement. A lock nut 76 retains the stud 74 in its adjusted position.

A U-shaped bracket 80 is fixed to the underside of the compressor plate 68 centrally thereof, by a plurality of cap screws 82. A shaft 84 is carried between the ears of the U-shaped bracket 80, and a sprocket 86 is rotatably mounted on the shaft 84. A chain 90 is trained around the sprocket 86. One end of the chain 90 is connected to a threaded stud 92 which projects through a suitable opening provided in the end plate 58 and has a nut 94 threaded on the portion of the stud 92 which is external of the end plate 58. The opposite end of the chain 90 is connected to a pivot pin 100 carried by an L-shaped bracket 102 fixed to the elbow 26. The bracket 102 is so positioned and located with respect to the elbow 26 that the pivot pin 100 is offset at approximately 45° above and to the rear of the axis of rotation of the swivel joint 32 which provides for movement of the conduit section 34 in a vertical plane.

Thus it can be seen that as the conduit section 34 rotates clockwise as viewed in FIGS. 2 and 3, the springs 72 will be compressed due to the action of the chain 90 moving the spring compressing plate 68 closer to the end plate 58 of the housing 52. Since the chain 90 passes over the sprocket 86 and is dead-ended on the end plate 58, it will be appreciated that a two-to-one ratio is provided, thus halving the amount of spring deflection resulting from angular movement of the conduit section 34. The nut 94, which is threaded onto the stud 92 at the dead-ended end of the chain 90, permits initial adjustment of the compression of the springs 72 to statically balance the weight of the conduit section 34.

Turning now to the graph illustrated in FIG. 4, the curve 110 plotted thereon is a sine curve which represents the torque or turning moment acting on the conduit section 34 due to gravity and tending to rotate the conduit section 34 clockwise as viewed in FIGS. 2 and 3. This turning moment is numerically equal to the weight of the conduit section 34 multiplied by the horizontal distance between the axis of rotation of the conduit section 34 and a vertical line drawn through its center of mass. Similarly, the curve 112 represents the torque or turning moment imposed upon the conduit section 34 by the counterbalance mechanism 50 of the invention and tending to rotate the conduit section 34 counterclockwise as viewed in FIGS. 2 and 3, thus compensating for the gravity force. This balancing torque is numerically equal to the actual spring force multiplied by the effective lever arm, or vertical distance from the axis of rotation of the conduit section 34 to the center line of the chain 90. While the two graphs have been plotted from a position 90° above the horizontal to a position 50° below the horizontal, the normal working range for the conduit section 34 is from a position 60° above the horizontal, indicated on the graph at 114, and a position 30° below the horizontal, indicated on the graph at 116.

It will be noted that between these limits of operation, the graph of the turning moment exerted by the counterbalance mechanism of the invention very closely approximates the sine curve representing the gravity-induced turning moment acting upon the conduit section 34.

It is evident, therefore, that the loading arm 20 is effectively counterbalanced and will remain motionless unless an external force is imposed upon it, in any position of the loading arm throughout the full normal operating range of the apparatus.

The modified counterbalance mechanism illustrated in FIG. 5 is essentially the same as that illustrated in FIG. 3 and those parts of the loading arm assembly on which it is mounted are given the same reference numerals as used in FIGS. 1–3, while those parts of the counterbalance mechanism 50a which are similar or perform similar functions to those described in connection with the structure illustrated in FIG. 3 are given the same reference numerals with the letter "a" appended thereto.

In this modified form of counterbalance mechanism 50a, the guide rods 62a are considerably longer than the rods 62 used in the structure illustrated in FIG. 3, and they are fastened to the lower, or inner end plate 58a. The chain 90a is connected directly to the plate 68a, and the springs 72a which surround the guide rods 62a and are confined between the end plate 58a and the compression plate 68a are mounted in pairs on the guide rods 62a with the end of one spring of each pair abutting the adjacent end of the other spring of the pair.

It will be evident that since there is a direct 1 to 1 ratio between the chain movement and the spring deflection in this type of construction, for a given angular movement of the loading arm 20 the springs 72a are deflected twice as much as compared with springs mounted as in the counterbalance mechanism illustrated in FIG. 3. The forces resulting from the deflection of the springs 72a will result in the same force diagram illustrated in FIG. 4 as do the forces due to deflection of the springs 72 in the structure illustrated in FIG. 3.

The modification disclosed in FIG. 6 is again similar to that disclosed in FIG. 3, and those parts thereof which are similar to or perform similar functions to those illustrated in FIG. 3 are given the same reference numeral with the letter "b" appended thereto. Again in this modification, as in the modification illustrated in FIG. 5, the chain 90b is connected directly to the spring compression plate so that there is a 1 to 1 ratio between the amount of chain travel and the spring deflection. In this instance the coil springs 72 have been eliminated, as have the guide rods 62 therefor. The springs 72 have been replaced by a tubular rubber sleeve 120, which is confined between the end plate 58b and the compression plate 68b and performs the same function as the coil springs 72 and 72a illustrated in FIGS. 3 and 5, respectively.

FIGS. 7 and 8 illustrate rear and side elevations, respectively, of a modification 20a of the loading arm assembly. In this form of the loading arm assembly, the elbow 38 at the distal end of the conduit section 34 has been rotated 90° so that the axis of the swivel joint 42 lies in a vertical plane, and a short conduit 150 connects the elbow 40 with a pair of elbows 162 and 154 interconnected by a swivel joint 156, the axis of which is horizontal. The elbow 154 is connected to the spout, or nozzle, 36. This modified structure permits the reach of the conduit section 34 to be extended by swinging the conduit 150 outwardly about the axis of the swivel joint 42.

The counterbalancing mechanism 50 used with this form of the loading device is essentially the same as that illustrated in FIG. 3, or may be the same as that illustrated in either of FIGS. 5 or 6. However, the attachment of the chain extending therefrom to the pivot point adjacent the swivel axis of the conduit section 34 has been slightly modified in a manner and for a purpose which will presently be explained in conjunction with FIG. 11.

FIGS. 9 and 10 illustrate rear and side elevations, respectively, of another modified form of loading arm assembly, indicated 20b. In this form of the loading arm 20b, a tube 160 is telescopically received within the conduit section 34 and is adapted to be slid outward from the conduit section 34 to increase the effective length thereof and thus increase the reach of the loading arm 20b. Again, as with the apparatus illustrated in FIGS. 7 and 8, the counterbalance mechanism 50 is the same as that illustrated in conjunction with FIGS. 1 through 3, or may be that illustrated in either FIG. 5 or FIG. 6. The connection of the chain extending therefrom to the pivot 100 adjacent the swivel axis of the conduit section 34 has been modified in the same way as in the apparatus illustrated in FIGS. 7 and 8.

It will be appreciated that whenever the conduit 150 of the modified form 20a of the loading apparatus illustrated in FIGS. 7 and 8 is swung outward to increase the reach of the apparatus, or when the tube 160 of the modified loading apparatus 20b is slid outwardly from the conduit section 34 to increase the reach thereof, the center of gravity of the arm will be shifted outward, thus resulting in an increase in the turning moment due to the gravity effect tending to rotate the arm clockwise as viewed in FIGS. 8 and 10, around its pivotal axis. In order to compensate for this increase in the turning moment tending to rotate the arm, the connection of the end of the chain of the counterbalance mechanism has been modified on each of these structures in the manner best illustrated in FIG. 11 to provide an increase in the counterbalancing force throughout the portion of the operating range of the conduit section 34 where such extension is likely to be effected.

The modification of the chain connection comprises a link 170 which is interposed between the inner end of the chain 90 and the pivot 100. One end of the link 170 is pivotally mounted on the pivot pin 100, and the other end of the link is pivotally connected to the chain 90 by a pivot pin 172. A stop screw 174 projects through a suitably tapped opening 176 in the link 170 and is adapted to abut the upper surface of the bracket 102 or the upper surface of the elbow 26, depending upon how much of the stop screw 174 projects through the link 170. A lock nut 178 on the stop screw 174 is adapted to maintain the stop screw in its adjusted position with relation to the link 170.

Above a certain predetermined angular position of the conduit section 34, the assembly 50 acts in the same manner as previously described, with the chain pivoting about the axis pivot pin 100. At said predetermined angular position of the conduit section 34, as determined by the extent the stop screw 174 is threaded through the link 170, the stop screw 174 contacts the upper surface of the bracket 102, or the upper surface of the elbow 26, and the link 170 is no longer permitted to rotate in a clockwise direction as viewed in FIGS. 8, 10 and 11 as the conduit section 34 is lowered. Thus the effective pivotal connection, or anchor point, of the chain 90 is shifted to the pivot pin 172 throughout the range of movement of the conduit section 34 below said predetermined angular position thereof at which the stop screw 174 makes contact. The effect of shifting of the pivotal connection of the chain 90 results in an increase in the length of the effective lever arm for the forces applied by the springs within the counterbalance mechanism 50 so that the counterclockwise moment applied to the conduit section 34 during the range of movement thereof wherein its reach is likely to be extended is greater than that which would normally be applied if the pivot shifting mechanism illustrated in FIG. 11 were not employed.

The pivot shifting mechanism has been shown for purposes of illustration as being in the position that it would be adjusted to effect a shift of the pivotal connection of the chain 90 from the pivot pin 100 to the pivot pin 172 when the conduit section 34 is in its position 30 degrees above the horizontal.

The graph illustrated in FIG. 12 again shows the curve 110 which is the sine curve representing the force of gravity acting on the conduit section 34, no extension of the arm being shown in this curve. The upper curve 180 represents the turning moment imposed by the counterbalance mechanism with the modification illustrated in FIG. 11, and with the stop screw 174 adjusted to contact the upper surface of the elbow 26 when the conduit section 34 is in the 30° position. It will be noted that due to the effect of the shifting of the pivotal connection of the chain 90, the curve makes a sharp upward break at the point where the stop screw 174 makes contact.

It should be realized that while the stop screw 174 is shown, and the graph has been plotted, with the stop screw making contact at the 30° position of the conduit section 34, the stop screw is adjustable and may be adjusted for making contact at other angles than at the 30° angle. It is most likely that the critical area where the reach of the conduit section 34 is likely to be extended would not extend up as far as the 30° above the horizontal position, and therefore the stop screw 174 would probably be adjusted to make contact when the conduit section 34 is at a somewhat lower elevation.

FIGS. 13 and 14 illustrate rear and side elevations, respectively, of a loading arm or conduit assembly 20c showing an alternative mounting for the counterbalance mechanism 50 of the present invention. In this structure, the elbow 26a which is pivotally connected to the vertical conduit section, or riser pipe, 22 by the swivel joint 28 is provided with an elongate vertical portion 180 to which the counterbalance assembly 50 (which may be any of those illustrated in FIGS. 3, 5, 6 or 11) is connected. The arm 102, which carries the pivot pin 100, is connected to the elbow 30 which moves with the conduit section 34 rather than the elbow 26a about which the conduit section 34 moves.

While the preferred embodiments of the present invention are described herein it should be noted that various changes may be made therein without departing from the scope of the invention as defined in the appended claims.

The invention having thus been described, what is claimed as new and desired to be protected by Letters Patent is:

1. A counterbalance for a loading arm structure comprising a first conduit and a second conduit projecting forward therefrom and connected thereto for pivotal movement about a horizontal axis, said counterbalance comprising a housing fixed to one of said conduits, spring means within said housing and affixed thereto, a chain tensioned by said spring means, a bracket mounted on the other of said conduits, a pivot pin carried by said bracket above and to the rear of said horizontal axis about which said second conduit pivots, a link connected to said pivot pin, said chain being pivotally connected to said link, and a stop screw on said link adapted to contact said bracket at a predetermined elevation of said second conduit whereby the turning moment applied to said second conduit by said spring means and chain is increased by shifting of the pivot point for said chain.

2. A counterbalance mechanism for a loading arm structure including a vertical conduit and a second conduit projecting forward therefrom and pivotally connected thereto for movement about a horizontal axis, said counterbalance mechanism comprising a housing fixed to said vertical conduit, a spring means within said housing, one end of said spring means being immovable relatively to said housing, a chain tensioned by said spring means, a bracket mounted on said second conduit, a pivot pin carried by said bracket above and to the rear of said horizontal axis about which said second conduit pivots, a link connected to said pivot pin and to said chain, and a stop screw adjustably mounted on said link and adapted to abut said bracket at a predetermined angular position of said second conduit whereby the turning moment applied to said second conduit by said spring means and chain is increased by shifting of the pivot axis of said chain when said stop screw contacts said bracket.

3. A counterbalance mechanism for a loading arm structure including a first conduit and a second conduit projecting forward therefrom and connected to said first conduit for pivotal movement about a horizontal axis, said counterbalance mechanism comprising a housing fixed to one of said conduits, spring means within said housing, one end of said spring means being immovable relatively to said housing, a sprocket connected to the other end of said spring means, a chain connected at one of its ends to said housing and trained around said sprocket, a bracket mounted on the other of said conduits, a pivot pin carried by said bracket, said pivot pin being positioned above and to the rear of the horizontal axis about which said second conduit pivots, a link connected to said pivot pin, the other end of said chain being connected to said link, a stop screw adjustably mounted on said link and adapted to abut said bracket at a predetermined angular position of said second conduit whereby the turning moment applied to said second conduit by said spring means and chain is increased by shifting of the pivot axis of said chain when said stop screw contacts said bracket.

4. A counterbalance mechanism for a loading arm structure including a first conduit and a second conduit projecting forward therefrom and connected to said first conduit for pivotal movement about a horizontal axis, a counterbalance mechanism fixed to one of said conduits, said counterbalance mechanism comprising a housing, a guide rod mounted in said housing, a coil spring surrounding said guide rod, a spring compressing plate slidable axially of said guide rod and abutting one end of said coil spring, the other end of said spring being immovable relatively to its guide rod, a chain operatively associated with said spring compressing plate to be tensioned thereby, a bracket mounted on the other of said conduits, a pivot pin carried by said bracket, above and to the rear of said horizontal axis about which said second conduit pivots, a link connected to said pivot pin, said chain being connected to said link, a stop screw adjustably mounted on said link and adapted to abut said bracket at a predetermined angular position of said second conduit whereby the turning moment applied to said second conduit by said spring and chain is increased by shifting of the pivot axis of said chain when said stop screw contacts said bracket.

5. A counterbalance for a loading arm structure including a first conduit and a second conduit projecting forward therefrom and connected to said first conduit for pivotal movement about a horizontal axis, a counterbalance mechanism, said counterbalance comprising a housing fixed to one of said conduits, a guide rod mounted in said housing, a coil spring surrounding said guide rod, a spring compressing plate slidable axially of said guide rod and abutting said spring, a sprocket connected to said compression plate, a chain fixed to one end to said housing and trained around said sprocket, a bracket mounted on the other of said conduits, a pivot pin carried by said bracket, said pivot pin being positioned above and to the rear of said horizontal axis about which said second conduit pivots, a link connected at one of its ends to said pivot pin, the other end of said chain being connected to the other end of said link, a stop screw adjustably mounted on said link and adapted to abut said bracket at a predetermined angular position of said second conduit whereby the turning moment applied to said second conduit by said spring and chain is increased by shifting of the pivot axis of said chain when said stop screw contacts said bracket.

6. A counterbalance mechanism for a loading arm structure including a first conduit and a second conduit projecting forward therefrom and connected thereto for pivotal movement about a horizontal axis, means for extending said second conduit to increase the reach thereof, said counterbalance mechanism comprising a housing fixed to one of said conduits, a plurality of guide rods mounted in said housing, coil springs surrounding said guide rods, a spring compressing plate slidable axially of said guide rods and abutting one end of each of said springs, the other end of each of said springs being immovable relatively to its associated guide rod, a sprocket connected to said compression plate, a chain fixed at one end to said housing and trained around said sprocket, a bracket mounted on the other of said conduits, a pivot pin carried by said bracket above and to the rear of said horizontal axis about which said second conduit pivots, a link connected at one of its ends to said pivot pin, the other end of said chain being connected to the other end of said link, a stop screw adjustably mounted on said link and adapted to contact said bracket at a predetermined angular position of said second conduit whereby the turning moment applied to said second conduit by said springs and chain is increased by shifting of the pivot axis of said chain to compensate for extension of said second conduit when said stop screw contacts said bracket.

References Cited in the file of this patent

UNITED STATES PATENTS

| 957,347 | Kennedy | May 10, 1910 |
| 2,927,607 | Bily | Mar. 8, 1960 |
| 3,021,867 | Gallagher | Feb. 20, 1962 |

FOREIGN PATENTS

| 580,640 | Schaetzley | of 1959 |